(12) United States Patent
Adimatyam et al.

(10) Patent No.: US 9,479,836 B2
(45) Date of Patent: Oct. 25, 2016

(54) METHOD AND APPARATUS FOR NAVIGATING AND PLAYING BACK MEDIA CONTENT

(75) Inventors: Venkata S. Adimatyam, Irving, TX (US); Srikrishnan Ganesan, Tamil Nadu (IN); Sameer Gavade, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1184 days.

(21) Appl. No.: 12/471,707

(22) Filed: May 26, 2009

(65) Prior Publication Data

US 2010/0306811 A1   Dec. 2, 2010

(51) Int. Cl.
| | |
|---|---|
| *H04N 7/173* | (2011.01) |
| *H04N 21/482* | (2011.01) |
| *H04N 5/445* | (2011.01) |
| *H04N 21/45* | (2011.01) |
| *H04N 21/258* | (2011.01) |
| *H04N 21/25* | (2011.01) |
| *H04N 21/433* | (2011.01) |

(52) U.S. Cl.
CPC .......... *H04N 21/482* (2013.01); *H04N 21/25* (2013.01); *H04N 21/25891* (2013.01); *H04N 21/4334* (2013.01); *H04N 21/4532* (2013.01)

(58) Field of Classification Search
CPC ................................................ H04N 21/4661
USPC ................................ 725/38, 80, 14; 386/296
See application file for complete search history.

(56) References Cited

U.S. PATENT DOCUMENTS

| | | | |
|---|---|---|---|
| 6,721,490 B1 * | 4/2004 | Yao .................. | H04N 21/23106 348/E5.008 |
| 7,284,032 B2 * | 10/2007 | Weber .............. | H04L 29/06027 709/204 |
| 8,595,375 B1 * | 11/2013 | Kuznetsov ........ | H04L 29/06027 709/219 |
| 2001/0007455 A1 * | 7/2001 | Yoo et al. ..................... 345/856 |
| 2005/0125828 A1 * | 6/2005 | Fujiwara ............ H04N 5/44543 725/60 |
| 2005/0268160 A1 * | 12/2005 | Taylor et al. ..................... 714/6 |
| 2006/0168631 A1 * | 7/2006 | Nishikawa et al. ............ 725/89 |
| 2006/0190959 A1 * | 8/2006 | Gatti et al. ...................... 725/13 |
| 2007/0092204 A1 * | 4/2007 | Wagner ................. H04N 5/782 386/241 |
| 2008/0310814 A1 * | 12/2008 | Bowra et al. ................... 386/46 |
| 2008/0313541 A1 * | 12/2008 | Shafton et al. .............. 715/725 |
| 2009/0043906 A1 * | 2/2009 | Hurst ............... H04N 21/23439 709/231 |
| 2009/0235297 A1 * | 9/2009 | Ferrone .............. H04N 5/44543 725/24 |
| 2010/0153984 A1 * | 6/2010 | Neufeld .......................... 725/14 |
| 2010/0251304 A1 * | 9/2010 | Donoghue et al. ............ 725/46 |
| 2010/0306811 A1 * | 12/2010 | Adimatyam et al. ......... 725/110 |
| 2012/0060093 A1 * | 3/2012 | Lee .......................... G09B 5/06 715/716 |
| 2012/0082432 A1 * | 4/2012 | Ackley .......................... 386/241 |
| 2012/0281964 A1 * | 11/2012 | Kelly ................... G11B 27/034 386/240 |
| 2013/0239145 A1 * | 9/2013 | Broome et al. ................ 725/41 |

* cited by examiner

*Primary Examiner* — Pankaj Kumar
*Assistant Examiner* — Reuben M Brown

(57) ABSTRACT

An approach is provided for navigating media content by specifying a time to start playback of the media content.

10 Claims, 8 Drawing Sheets

METHOD AND APPARATUS FOR NAVIGATING AND PLAYING BACK MEDIA CONTENT

BACKGROUND INFORMATION

Advances in computers, interactive electronic communications, and the Internet have resulted in a reinvention of conventional entertainment and communication services to enhance programming, recording, and viewing of a growing library of media content. Today, it is not uncommon for consumers to have access to hundreds, if not thousands, of media programs from a multitude of sources such as broadcast television, on-demand programming, and other third party content providers available through the Internet. However, while the programming choices available to consumers have progressed, the way consumers access and view those choices have not kept pace. In many cases, a consumer must play a media program from the start or from where the consumer last viewed the program. Typically, the only way to navigate within a media program is through a fast forward or reverse function to advance or rewind through the program.

Therefore, there is a need for an approach for easily and precisely navigating to specific points within media content to initiate play back.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for navigating and playing back media content are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), and/or a personal computer (PC), as well as other like technologies and customer premises equipment (CPE).

Figure 1:
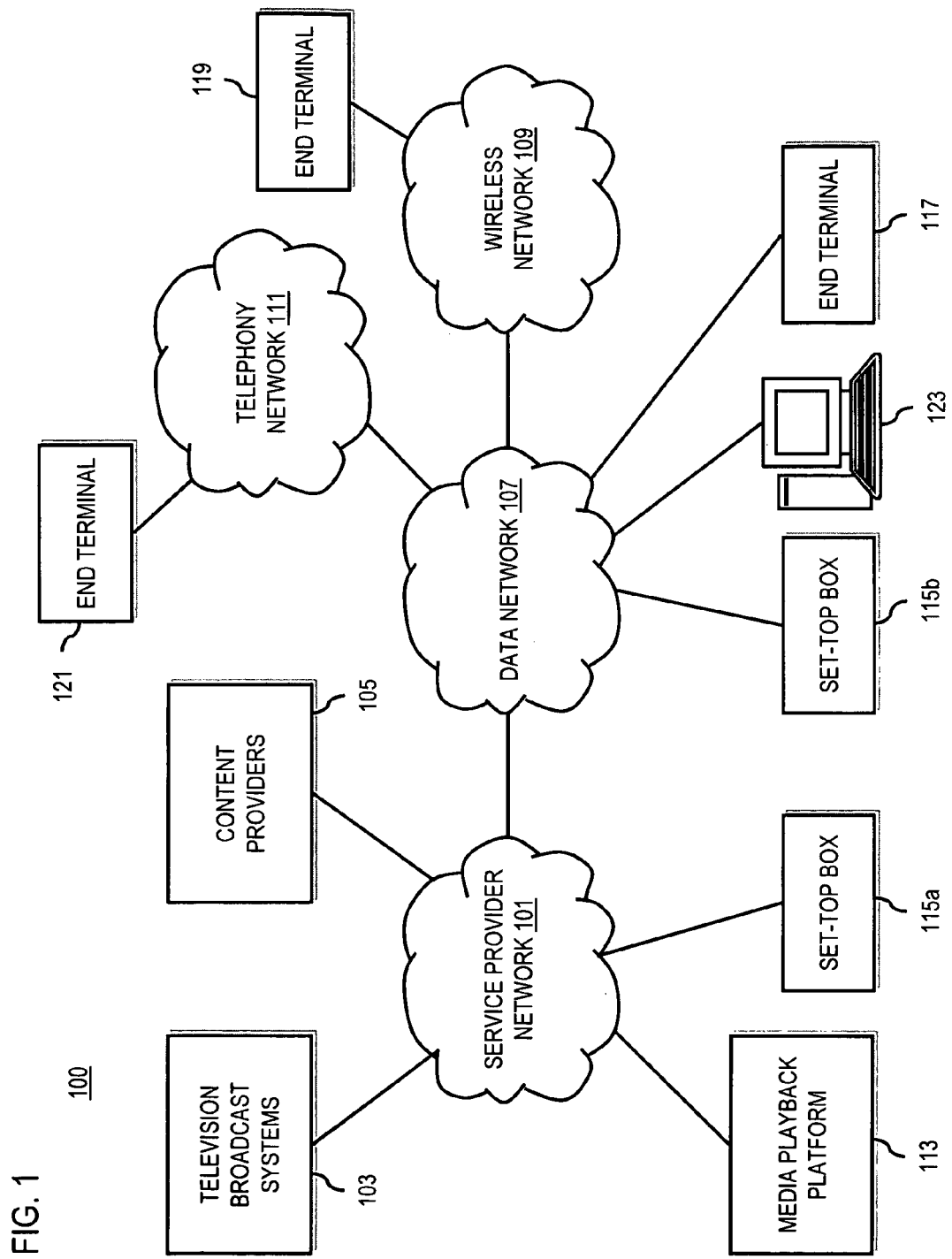
FIG. 1 is a diagram of a system capable of navigating and playing back media content, according to an exemplary embodiment.

FIG. 1 is a diagram of a system capable of navigating and playing back media content, according to an exemplary embodiment. For the purposes of illustration, a system 100 for navigating and playing back media content is described with respect to a service provider network 101 including one or more media service providers such as television broadcast systems 103 and content providers 105. It is contemplated that system 100 may embody many forms and include multiple and/or alternative components and facilities. As used herein, the terms STB, media-based device, and user equipment are interchangeable. Furthermore, media content is contemplated broadly to include a wide range of media. Media content can include any audio-visual content (e.g., broadcast television programs, digital video recorder (DVR) content, on-demand programs, pay-per-view programs, IPTV (Internet Protocol Television) feeds, DVD related content, etc.), pre-recorded media content, data communication services content (e.g., commercials, advertisements, videos, movies, songs, audio books, etc.), Internet-based content (e.g., streamed video, streamed audio), and/or any other equivalent media form.

In addition, system 100 includes a data network 107, a wireless network 109, and a telephony network 111. It is contemplated that the data network 107 may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network 109 may be, for example, a cellular network and may employ various technologies including code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, wireless fidelity (WiFi), satellite, and the like.

These networks 107-111, in conjunction with the service provider network 101, can support various multimedia sessions containing a variety of media content (e.g., television broadcasts, on-demand videos, etc.). The media playback platform 113 introduces the capability to start playback of a media program from a user-specified time. As shown in FIG. 1, the platform 113 resides on the network side. In addition (or alternatively), the chaptering manager platform 113 may reside within a customer premises equipment (CPE) (not shown) or the media device (e.g., STB) itself. Specifically, the media playback platform 113 enables a user to enter an exact time within a media program from which to start playback. The user may specify the playback point before beginning playback, in which case the function is described as a "play from" function. In addition, the user may specify a playback point event after beginning playback of the media program, in which case the function is described as a "skip to" function. In either case, the user is able to enter a time and then receive playback of a media program beginning from that specific time. In certain embodiments, the media playback platform 113 also presents a guide of various time points with the program to guide the user's selection. This guide may, for instance, be based on programming information or on data collected from monitoring the playback habits of a group of users. In this way, the chaptering manger platform 113 enables the user to precisely identify and navigate to specific points within a video program by entering a time corresponding to the desired point within the media program.

As discussed above, users have been limited primarily to fast forwarding and rewinding to navigate to specific points within a media program. The media playback platform 113 overcomes this limitation by enabling direct access to any point of the media program by specifying a time from which to start playback of the program.

As seen in FIG. 1, the media playback platform 113 has connectivity to STBs 115a and 115b via service provider network 101 and data network 107 respectively. The platform 113 also has connectivity to end terminal 117 via data network 107, end terminal 119 via wireless network 109, and end terminal 121 via telephony network 111. Any of the devices (i.e., STBs 115a-115b and end terminals 117-121) may provide access to the services and functions of the media playback platform 113.

For example, end terminal 117 may be any computing device (e.g., Personal Digital Assistant (PDA), personal computer, laptop, etc.) or communication device (e.g., a video conferencing terminal, a digital home communication terminal (DHCT) capable of providing access to the services and functions of the media playback platform 113. End terminal 119 may be any media-enabled mobile device (e.g., a mobile handset, video-capable cellular telephone, etc.). Furthermore, end terminal 121 may, for instance, include a home communication terminal (HCT) or any other telephonic device capable of accessing the services and functions of the media playback platform 113.

The data network 107 additionally permits a host 123 to access media playback platform 113 services and functions via a graphical user interface (GUI) such as a browser application or any web-based application for STBs 115a-115b and/or end terminals 117-121. Under one scenario, it is contemplated that a user can configure media playback services, functions, and preferences for STBs 115a-115b and/or end terminals 117-121 via a web browser.

STBs 115a-115b and/or end terminals 117-121 can communicate using data network 107, wireless network 109, and/or telephony network 111. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, Long Term Evolution (LTE) networks, wireless fidelity (WiFi) networks, other wireless networks (e.g., 3G wireless broadband networks, mobile television networks, radio networks, etc.), terrestrial broadcasting networks, provider specific networks (e.g., a Verizon® FiOS network, a TIVO™ network, etc), and the like. Such networks may also utilize any suitable protocol supportive of data communications, e.g., transmission control protocol (TCP), Internet protocol (IP), user datagram protocol (UDP), hypertext markup language (HTML), dynamic HTML (DHTML), file transfer protocol (FTP), telnet, hypertext transfer protocol (HTTP), asynchronous transfer mode (ATM), wireless application protocol (WAP), socket connection (e.g., secure sockets layer (SSL)), Ethernet, frame relay, and the like, to connect STBs 115a-115b and/or end terminals 117-121 to the media playback platform 113 and to various sources of video content.

Although depicted in FIG. 1 as separate networks, data network 107, wireless network 109, and/or telephony network 111 may be completely or partially contained within service provider network 101. For example, service provider network 101 may include facilities to provide for transport of packet-based, wireless, and/or telephony communications. As such, exemplary embodiments of media playback platform 113 may, for instance, comprise hypertext markup language (HTML) user interfaces or JAVA™ applets accessed via world-wide-web pages. These interfaces are particularly useful in extending system 100 functionality to devices having limited resources (e.g., PDAs, handsets, thin-clients, etc.), as well as providing scalable solutions to varied devices without necessitating intensive high-end costs associated with independent design, tooling, and manufacturing.

In particular embodiments, service provider network 101 can include an IPTV system (not shown) configured to support the transmission of television programs from television broadcast systems 103 as well as other media content, such as media content from the various third-party content providers 105 utilizing IP. That is, the IPTV system may deliver signals and/or media content in the form of IP packets. Further, the transmission network (e.g., service provider network 101) may optionally support end-to-end data encryption in conjunction with the delivery of video content.

In this manner, the use of IP permits media content to be integrated with broadband Internet services, and thus, share common connections to a user site. Also, IP packets can be more readily manipulated, and therefore, provide users with greater flexibility in terms of control, as well as offer superior methods for increasing the availability of media content. Delivery of media content, by way of example, may be through a multicast from the IPTV system to the STBs 115a-115b and end terminals 117-121. Any individual STB or end terminal may tune to a particular media source by simply joining a multicast (or unicast) of the media content utilizing an IP group membership protocol (IGMP). For instance, the IGMP v2 protocol may be employed for joining STBs to new multicast (or unicast) groups. Such a manner of delivery avoids the need for expensive tuners to access media content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the media content may be provided to various IP-enabled devices, such as the computing, telephony, and mobile apparatuses previously delineated.

While system 100 is illustrated in FIG. 1, the exemplary components are not intended to be limiting, and indeed, additional or alternative components and/or implementations may be utilized.

In one embodiment, the media playback service is a managed service, whereby a service provider operates the platform 113 to serve one or more subscribers.

Figure 2:
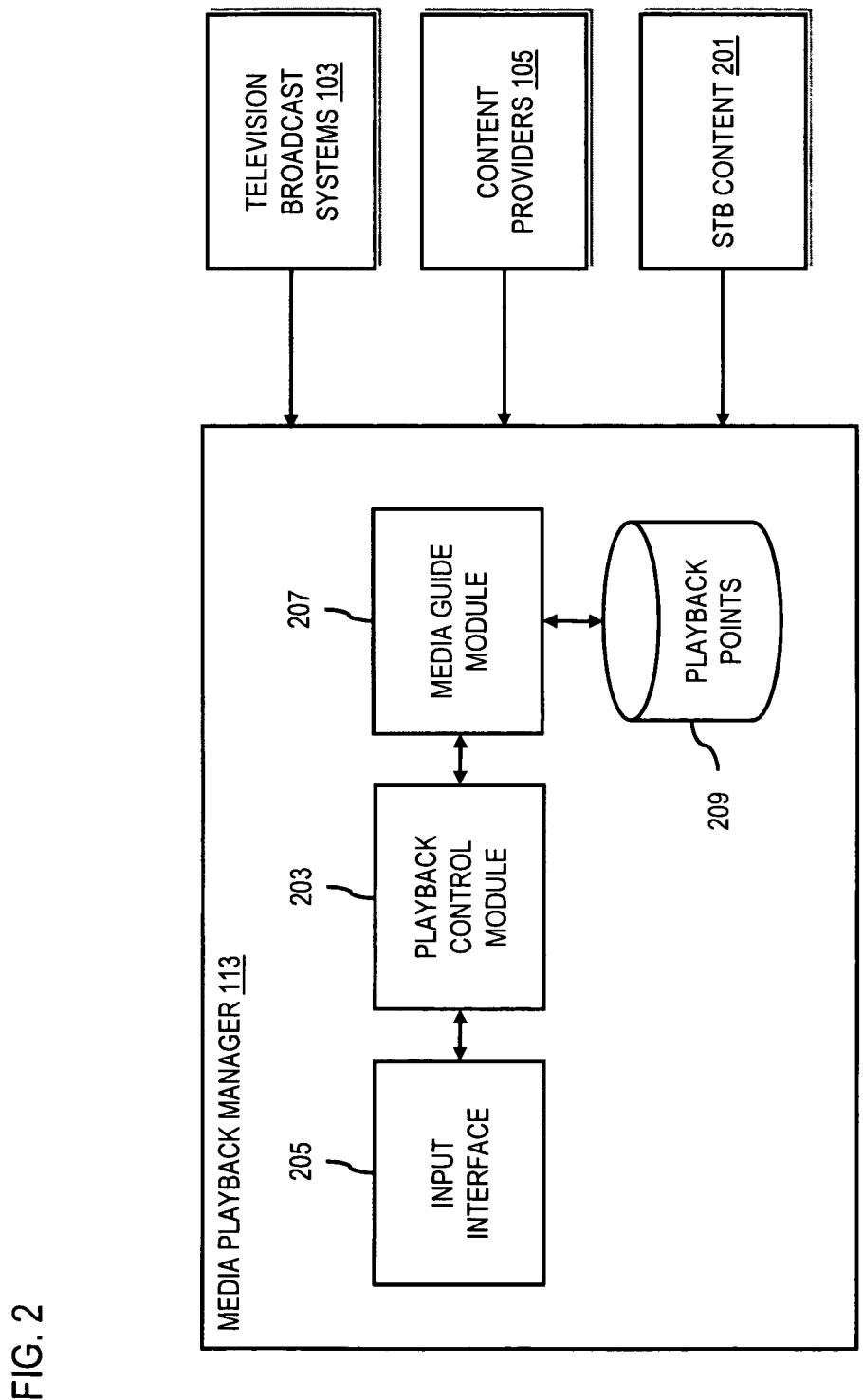
FIG. 2 is a diagram of the components of a media playback manager, according to an exemplary embodiment.

FIG. 2 is a diagram of the components of a media playback platform, according to an exemplary embodiment. By way of example, the media playback platform 113 may include one or more of the modules and/or databases to enable playback of media content from a specified point or time within the media content. In exemplary embodiments, the platform 113 has connectivity to, for instance, television broadcast systems 103, content providers 105, and STB content 201 to access media content. For example, STB content 201 includes media content stored or recorded in the STB (e.g., DVR content, downloaded content, on-demand content, etc.). It is contemplated that the platform 113 may access any media content available within the system 100. Within platform 113, the playback control module 203 responds to user requests for playback of media content by, for instance, retrieving the requested media content and playing the content starting from the requested time. The playback control module 203 has connectivity to an input interface 205 for receiving the user request for playback as input specifying the media content and time within the media content to begin playback. By way of example, the user interface 205 enables input via, for instance, control buttons located on the STB or external input devices such as a remote control, keyboard, mouse, pointer, or other similar control device.

The playback control module 203 also interacts with a media guide module 207 to present a program guide describing or listing one or more points within a particular media program to help the user select a particular point in the media content for playback. In exemplary embodiments, the media guide module 207 can also obtain information about the duration of the selected media content and present it to the user as part of the guide. As discussed previously, the guide can be created from programming information available from the service provider network 101, the television broadcast systems 103, or content providers 105. For example, the guide information may include a time and a corresponding description, picture, or other representation of the media at the particular time. In addition or alternatively, the media guide module 207 can determine suggested playback points for a particular media program by aggregating and analyzing the playback habits and other related information (e.g., favorite time points, how many times does a user skip around a program, and the like) from users accessing a particular program. For example, as more users view a particular, more information is likely to become available concerning which playback times typical users have been selecting for a particular program. The media guide module 207 can then, for instance, determine suggested playback points from the aggregated information and present them to the user in the form of a program guide. In exemplary embodiments, the media guide module 207 stores the determined suggested playback points and other program guide information in the database 209 of playback points.

Figure 3:
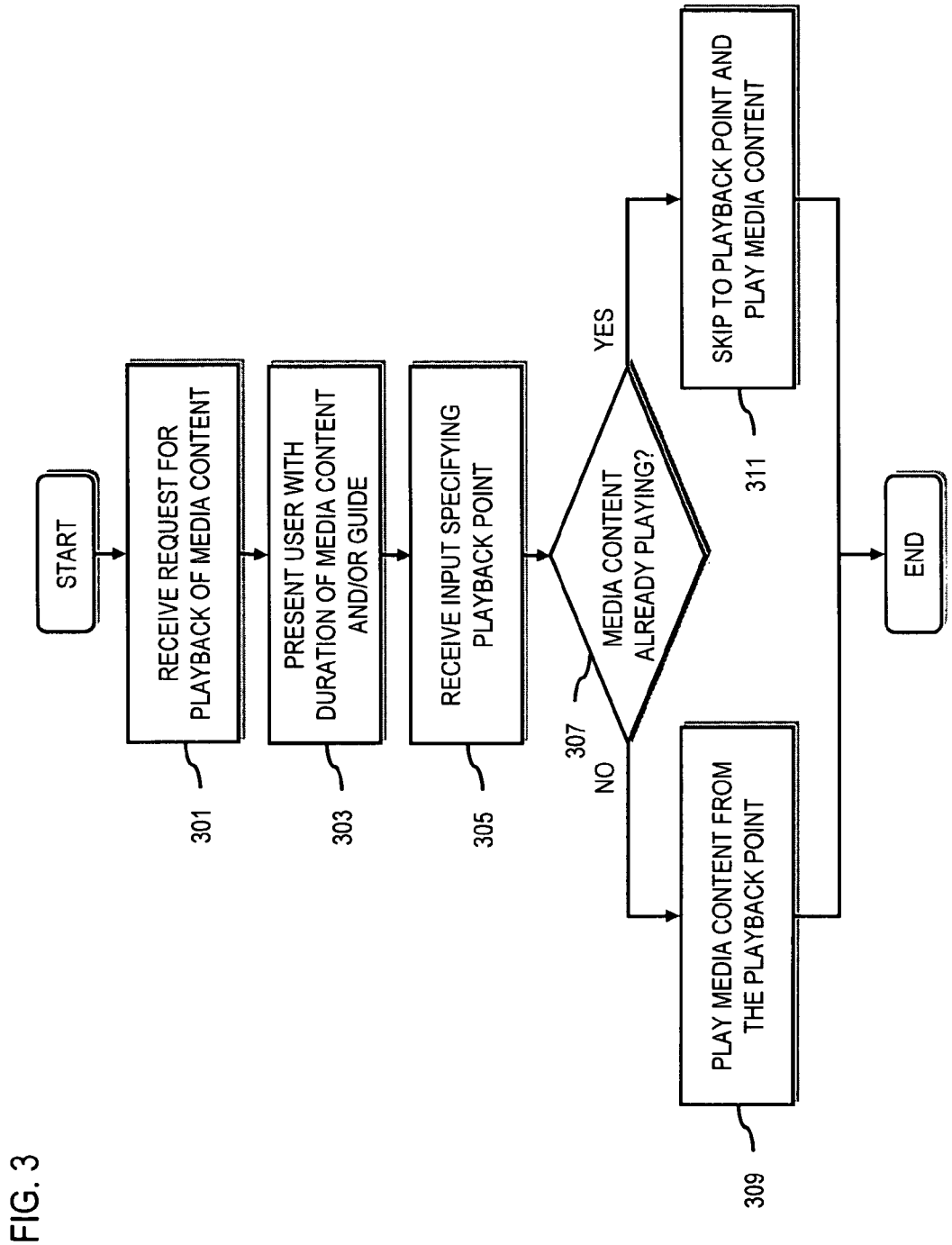
FIG. 3 is a flowchart of a process for navigating and playing back media content, according to an exemplary embodiment.

FIG. 3 is a flowchart of a process for navigating and playing back media content, according to an exemplary embodiment. In step 301, the media playback platform 113 receives a request from a user for playback of media content (e.g., a recorded television program). The user may make this request by, for instance, selecting from a menu or list of available media content. In response, the media playback platform 113 retrieves information on the duration of the media content (e.g., the complete playing time of the media content) to present to the user (step 303). For example, the media playback manager 113 consults the programming information available from the television broadcast systems 103, content providers 105, and/or service provider network 101. In certain embodiments, the media playback manager 113 can also consult information available over the Internet and/or information sources available over, for instance, the data network 107. In one example, the platform 113 receives a request to playback a media program and, accordingly, determines the duration of the media program is 45 minutes using an Internet query. The platform then displays the determined program duration to the user.

In exemplary embodiments, displaying the duration of the program informs the user of the time boundaries from which the user can chose a playback point or time (e.g., a valid user input is from 0 minutes to end of the duration of the program). In addition or alternatively, the media playback platform 113 presents a guide of time points within the media program that may be of interest the user. As discussed with respect to FIG. 2, the guide contains program information and/or suggested playback points determined from aggregated playback data collected from a group of users.

In the next step 305, the media playback platform 113 receives input from the user for specifying a point from which to start playback of the media content. For example, the input may request that the platform begin playback at the twenty minute mark of the program. The platform 113 then determines whether the selected media content is already playing (step 307). If the selected media program is not already playing on the user's STB, the platform 113 initiates playback of the media program beginning directly at the selected time (e.g., at the twenty minute mark) (i.e., "play from" mode of operation) (step 309). If the selected media program is already playing on the user's STB, the platform 113 skips from the current play position to the selected time (e.g., twenty minutes) (i.e., "skip to" mode of operation) (step 311). It is contemplated that the selected time point may be either before or after the current playback position. In either case, the platform 113 provides direct access to the selected time point in the media program.

In addition, it is contemplated that the STB box may be configured to play the media content as a standalone STB or as a STB networked to one or more other set-top boxes for sharing the media content. For example, in standalone mode, the STB contains the media content within its own storage system (e.g., an internal hard drive, flash memory, removable memory, CD-ROM, DVD disk, etc.). In networked mode, the STB retrieves the selected media content from another networked STB, DVR, computer, server, or other similar network node (e.g., a multi-room DVR (MR-DVR) system).

Figure 4:
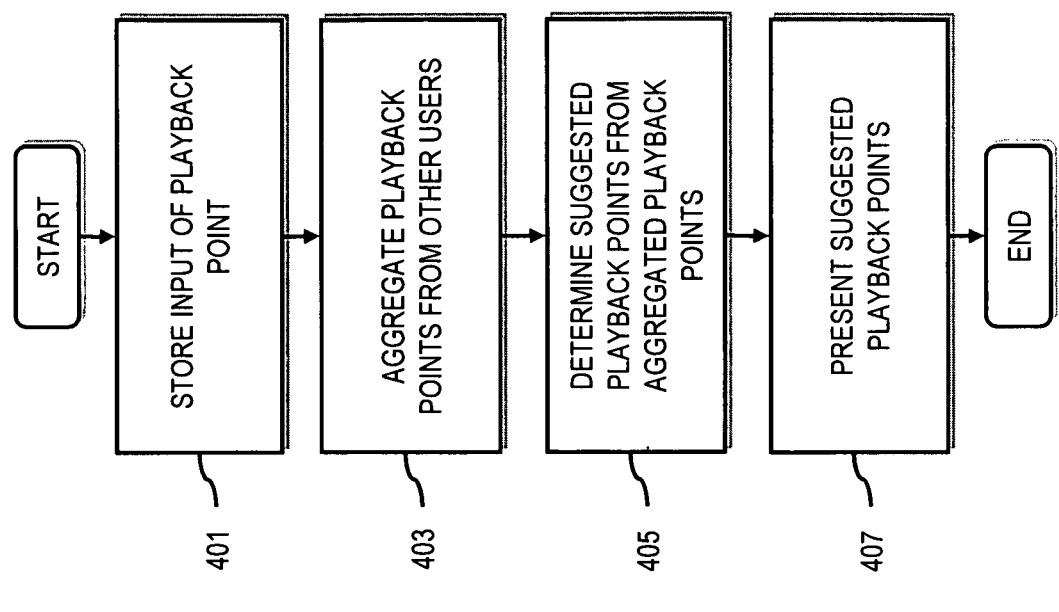
FIG. 4 is a flowchart of a process for suggesting one or more playback points based on aggregated playback information, according to an exemplary embodiment.

FIG. 4 is a flowchart of a process for suggesting one or more playback points based on aggregated playback information, according to an exemplary embodiment. As discussed previously, the media playback platform 113 can aggregate information on the playback habits of a group of users to determine suggested playback points for a particular media program. The process 400 describes one embodiment of this aggregation process. In step 401, the media playback platform 113 stores a record of the user's input for specifying a time to start playback of a media program as the input is made. This record, for instance, includes an identifier of the media content (e.g., content identification number, program name, etc.) and the time or times selected by the user for accessing the content. In one embodiment, the input is stored without reference to the identity of the user who made the selection. In this way, any information collected on the playback selection of the user is anonymous with respect to the user. As an added measure of privacy protection, the media playback platform 113 can also enable the user to select not to have the platform 113 collect information about the user's input.

As the media playback platform 113 stores playback information from users, the media playback platform 113 aggregates the collected information (step 403). For example, the platform 113 sorts the input by media content, so that all information collected about playback selections for each media program is grouped together. In one embodiment, the aggregation process is dynamic and occurs as each new input is added to the aggregated set of previously collected inputs. The media playback platform 113 then analyzes the aggregated information to determine suggested playback points for the media programs for which aggregated information is available (step 405). By way of example, the media playback platform 113 may determined the suggested playback points by analyzing the information to determine the most popular time selections for a media program. In another embodiment, the media playback platform 113 may determine the suggested playback points by analyzing the playback selections of other users with similar viewing preferences as the user requesting the playback suggestions. It is contemplated that the media playback platform 113 may use any process or algorithm for determining suggested playback points from the aggregated information. The platform 113 then presents the determined suggested playback points to the user as, for instance, part of the program guide (step 407).

Figure 5:
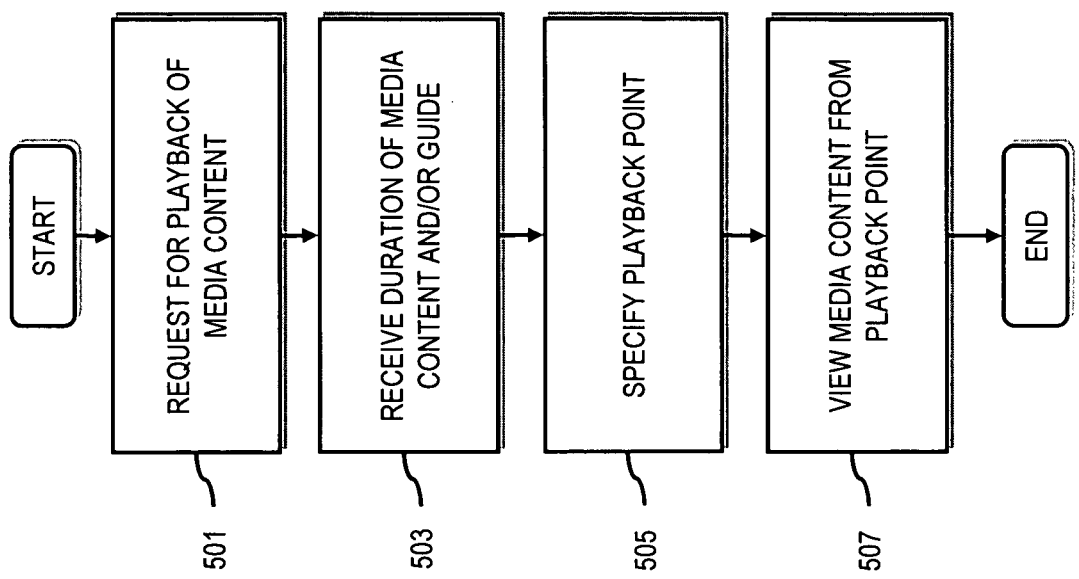
FIG. 5 is a flowchart of a process for accessing the functions of the media playback platform, according to an exemplary embodiment.

FIG. 5 is a flowchart of a process for accessing the functions of the media playback platform, according to an exemplary embodiment. The process 500 describes the process for accessing the functions of the media playback platform from a user's perspective. In step 501, the user initiates a request for playback of media content (e.g., a recorded television program). For example, the user may select the desired media program from a menu of media content to initiate the request. In response, the user receives, for instance, an information screen presenting the duration of the requested media program from the media playback platform 113 (step 503). In certain embodiments, the user may also receive a guide describing various playback points with the selected program and/or presenting suggested playback points determined from an aggregated collection of information about the playback habits of a group of user as described with respect to FIGS. 3 and 4.

Next, the user specifies a playback point by, for instance, entering a time within the duration of the selected media program from which to start playback (step 505). If the user's STB is not already playing the selected program, the media playback platform 113 initiates playback beginning directly at the selected time. If the user's STB is already playing the selected, the media playback platform 113 directs the STB to skip to the selected time and continue playback from that point. The user then views the selected media content from the selected time (step 507).

Figure 6A:
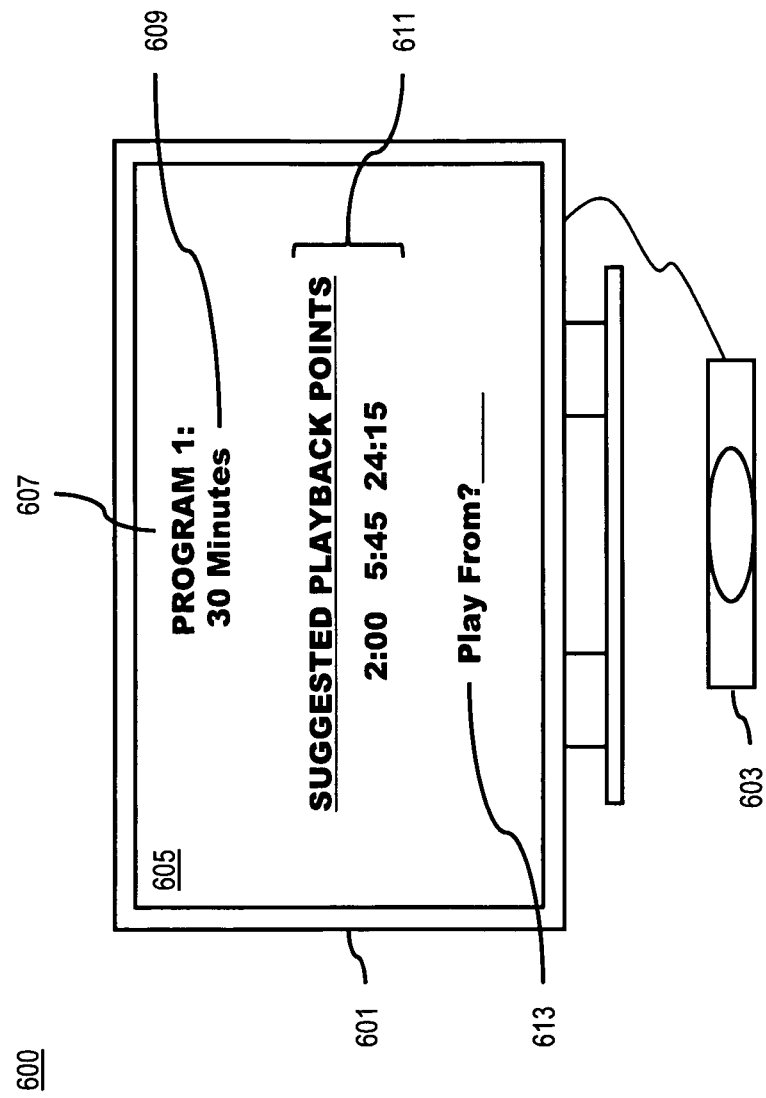
FIGS. 6A-6B are diagrams of user interfaces utilized in the processes of FIGS. 3-5, according to various embodiments.
Figure 6B:
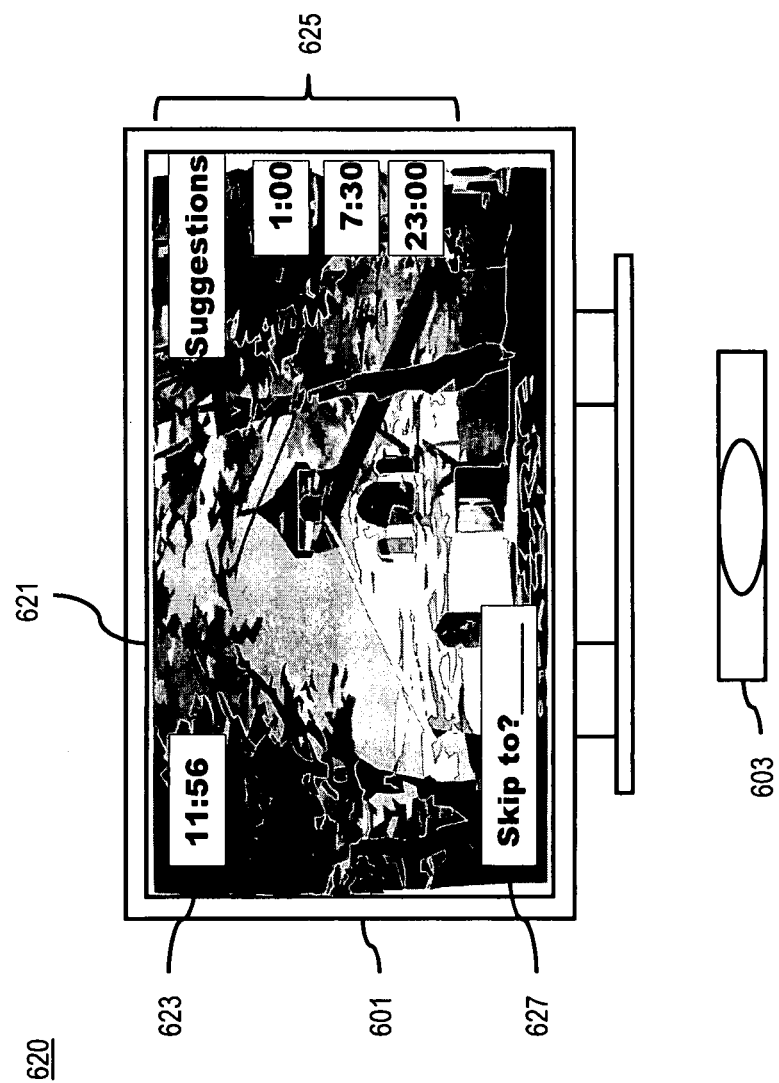

FIGS. 6A-6B are diagrams of user interfaces utilized in the processes of FIGS. 3-5, according to various embodiments. The user interface 600 of FIG. 6A is presented on a display 601 by a STB 603. In this example, the STB 603 includes or has connectivity to a media playback platform 113 to enable playback of media content from a specific time. As shown in FIG. 6A, the user has selected "Program 1" for playback on the STB 603. In response, the STB 603 displays a user interface screen 605 presenting the name 607 of the selected media content "Program 1" and duration 609 of the program. The user interface screen 605 also includes a guide 611 of suggested playback points (e.g., 2:00 minutes, 5:45 minutes, and 24:14 minutes). The user may then enter a time in the input area 613 labeled "Play From?" from which to start playback. For example, the user enters one of the suggested playback points or any other time within the duration (e.g., 30 minutes) of the selected program.

FIG. 6B depicts a user interface 620 for skipping to a user-specified time point in a media program that is currently playing, according to an exemplary embodiment. The user interface 620 is presented on the display 601 by the STB 603. In this example, the STB 603 is already playing the selected video program, and the user has activated the "skip to" function of the media playback platform 113. Accordingly, the user interface screen 621 displays the current playback position 623 (e.g., 11:56 minutes), suggested playback points 625 (e.g., 1:00 minutes, 7:30 minutes, and 23:00 minutes), and an input area 627 labeled "Skip to." The user then enters a time within the media program to skip to and continue playback. As described with respect to FIG. 6A, the user may enter one of the suggested playback points or any other time within the duration (e.g., 30 minutes) of the selected program.

One of ordinary skill in the art would recognize that the processes described above may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 7:
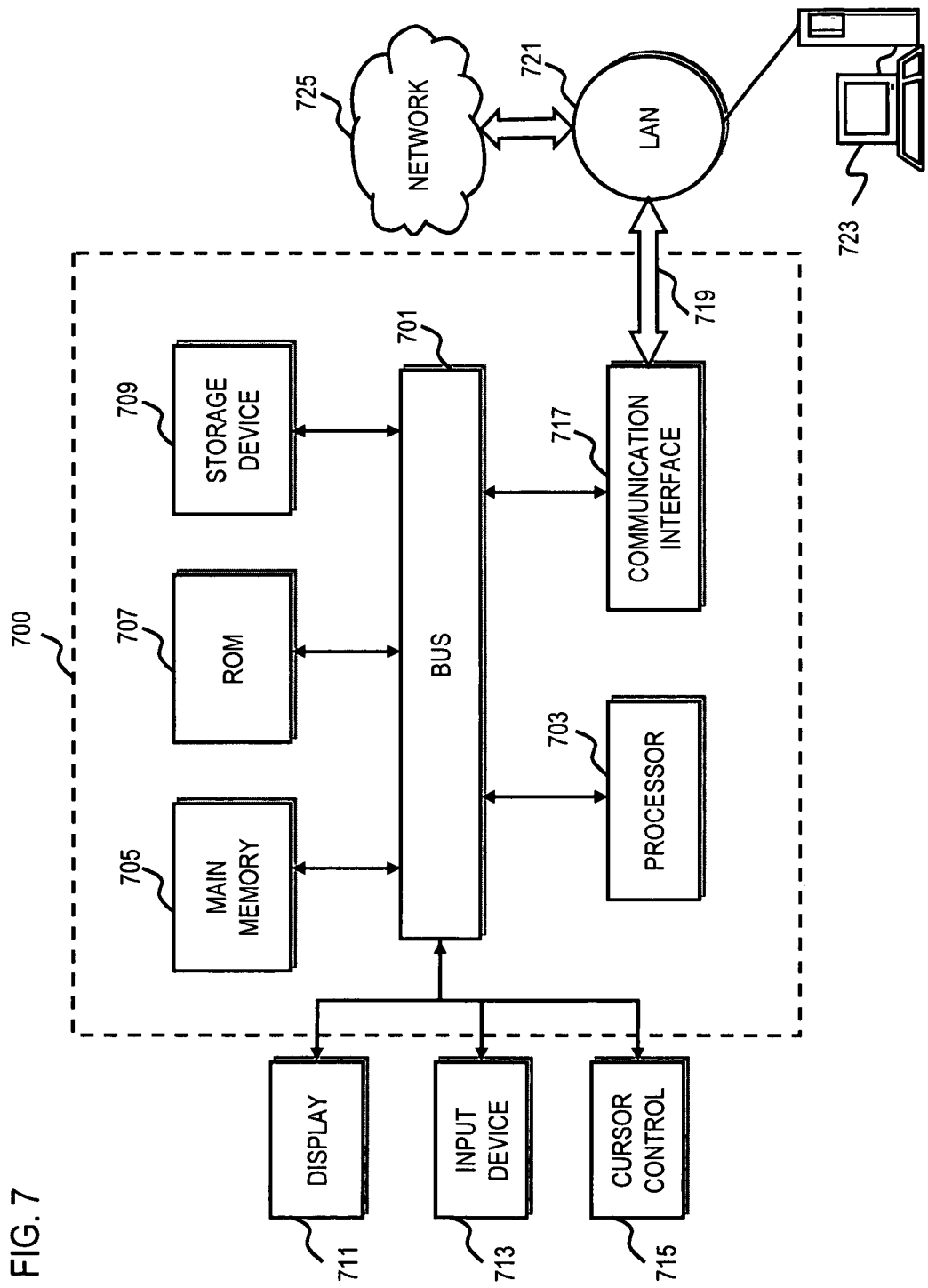
FIG. 7 is a diagram of a computer system that can be used to implement various exemplary embodiments.

FIG. 7 illustrates computing hardware (e.g., computer system) upon which an embodiment according to the invention can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
prior to beginning playback of a media content:
presenting to a user a total time duration of an entirety of the media content as a numerical time value, two or more suggested playback points, and an input area for the user to enter a specific numerical time value within the time duration of the media content to begin playback of the media content, wherein presenting the two or more suggested playback points comprises analyzing playback information corresponding to a plurality of aggregated inputs from a plurality of other users indicating playback points of the media content and corresponding times of the playback points within the time duration of the media content, and determining the two or more suggested playback points based on the playback information,
receiving an input from the user specifying a playback point from which to start playback of the media content, and
beginning playing back the media content from the specified playback point; and after beginning playback of the media content:
presenting to the user a current playback position of the media content being played back as another numerical time value, the two or more suggested playback points to skip to from the current playback position, and another input area for the user to enter another specific numerical time value within the time duration of the media content to skip to from the current playback position, wherein the two or more suggested playback points and the specific numerical time value the user can enter can be before the current playback position as well as after the current playback position,
receiving another input from the user specifying a playback point from which to skip to from the current playback position, and
continuing playing back the media content from the specified playback point from which to skip to from the current playback position.

2. A method of claim 1, wherein the media content includes either broadcast content, digital video recorder (DVR) content, pay-per-view content, Internet Protocol Television (IPTV) content, data communication services content, Internet-based content, or a combination thereof.

3. A method of claim 1, further comprising:
storing the input for use in determining one or more subsequent suggested playback points.

4. A method of claim 1, wherein the media content is played on a stand-alone set-top box.

5. A method of claim 1, wherein the media content is played on a set-top box networked to one or more other set-top boxes for sharing the media content.

6. A set-top box apparatus comprising:
a media guide module configured to present a user with a time duration of a media content, to
a media guide module configured to:
prior to beginning playback of a media content, present to a user, on a user interface, a total time duration of an entirety of the media content as a numerical time value, two or more suggested playback points, and an input area to receive from the user a specific numerical time value within the time duration of the media content to begin playback of the media content, wherein presenting the two or more suggested playback points comprises analyzing playback information corresponding to a plurality of aggregated inputs from a plurality of other users indicating playback points of the media content and corresponding times of the playback points within the time duration of the media content, and determining the two or more suggested playback points based on the playback information, and
after beginning playback of the media content, present to the user, on the user interface, a current playback position of the media content being played back as another numerical time value, the two or more suggested playback points to skip to from the current playback position, and another input area to receive from the user another specific numerical time value within the time duration of the media content to skip to from the current playback position, wherein the two or more suggested playback points and the other specific numerical time value the user can enter can be before the current playback position as well as after the current playback position; and
a playback control module configured to:
prior to the beginning playback of the media content, play the media content from the specified playback point, and
after beginning playback of the media content, continuing playing back the media content from the specified playback point from which to skip to from the current playback position.

7. An apparatus of claim 6, wherein the media content includes either broadcast content, digital video recorder (DVR) content, pay-per-view content, Internet Protocol Television (IPTV) content, data communication services content, Internet-based content, or a combination thereof.

8. An apparatus of claim 6, wherein the media guide module is further configured to store the input for use in determining one or more subsequent suggested playback points.

9. An apparatus of claim 6 configured as a stand-alone set-top box for playback of the media content.

10. An apparatus of claim 6 networked to one or more other set-top boxes for playback of the media content.

* * * * *